United States Patent
Sheynblät

(10) Patent No.: US 8,285,504 B2
(45) Date of Patent: Oct. 9, 2012

(54) METHOD OF OBTAINING MEASUREMENT DATA USING A SENSOR APPLICATION INTERFACE

(75) Inventor: Leonid Sheynblät, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/200,646

(22) Filed: Aug. 28, 2008

(65) Prior Publication Data

US 2009/0055048 A1     Feb. 26, 2009

Related U.S. Application Data

(63) Continuation of application No. 11/688,824, filed on Mar. 20, 2007, now abandoned.

(60) Provisional application No. 60/784,608, filed on Mar. 20, 2006.

(51) Int. Cl.
    *G01N 37/00*     (2006.01)
    *G06F 11/00*     (2006.01)

(52) U.S. Cl. ............... 702/81; 702/82; 702/83; 702/188

(58) Field of Classification Search ............. 702/81–84, 702/181–190; 22/81–84, 181–189
See application file for complete search history.

(56) References Cited

U.S. PATENT DOCUMENTS

| | | | |
|---|---|---|---|
| 2004/0193385 A1* | 9/2004 | Yutkowitz | 702/151 |
| 2004/0211258 A1* | 10/2004 | Geen | 73/510 |
| 2006/0017821 A1 | 1/2006 | Garvey, III et al. | |
| 2006/0184336 A1* | 8/2006 | Kolen | 702/150 |

* cited by examiner

*Primary Examiner* — Phuong Huynh
(74) *Attorney, Agent, or Firm* — Linda G. Gunderson

(57) ABSTRACT

A method involves, via a sensor application interface, 1) receiving, from an application, a measurement request associated with a quality-of-service control; 2) in accord with the quality-of-service control, obtaining measurement data from a sensor; and 3) returning to the application i) the measurement data obtained from the sensor, and ii) an indicator of accuracy of the measurement data.

27 Claims, 2 Drawing Sheets

METHOD OF OBTAINING MEASUREMENT DATA USING A SENSOR APPLICATION INTERFACE

CLAIM OF PRIORITY UNDER 35 U.S.C. §119

The present Application for Patent claims priority to U.S. patent application Ser. No. 11/688,824 entitled "Method Of Obtaining Measurement Data Using A Sensor Application Interface" filed Mar. 20, 2007, which claims priority to Provisional Patent Application No. 60/784,608 entitled "Sensor Application Interface" filed Mar. 20, 2006, assigned to: the assignee hereof and hereby expressly incorporated by reference herein.

BACKGROUND

There are many sensors on the market today. These sensors are designed to convert a physical phenomenon into an electrical signal. For example,
Barometric Pressure Sensor
Measures atmospheric pressure
   Altitude
   Weather
Accelerometer
Measures direction of gravity
   Linear movement
   Tilt (Roll, Pitch)
   Shock sensing
   Free-fall
Gyroscope
Measures Coriolis effect
   Heading Changes
   Rotation
Magnetic Field Sensor
Measures direction of magnetic field
   Compass
   Absolute Heading Accelerometers are the most widely used MEMS sensors with millions integrated into cars by the automotive industry. As said above, the linear accelerometers can sense the linear motion and can provide a measure of tilt. With a 3D accelerometer, motion in (x, y, z) can be sensed. In addition, the direction of the gravity can be used to estimate the roll ($\theta$) and pitch ($\phi$) (see FIG. 1).

DETAILED DESCRIPTION

Unfortunately, in wide number of cases it is difficult to differentiate between a linear motion (acceleration in x, y, z) and the change in the orientation of the device and the corresponding change in roll and pitch. Furthermore, a change in the heading (aka yaw or azimuth, $\psi$) can not be sensed by the linear accelerometers at all. For sensing the change in the heading, gyroscopes are commonly used. However, gyroscopes are expensive, large and complex structures and therefore more expensive than accelerometers.

Figure 1:
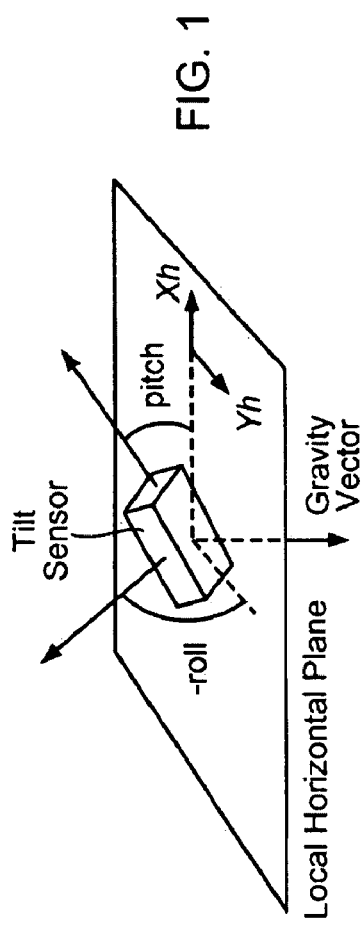
FIG. 1 is an illustration of a single-sensor accelerometer configuration.
Figure 2:
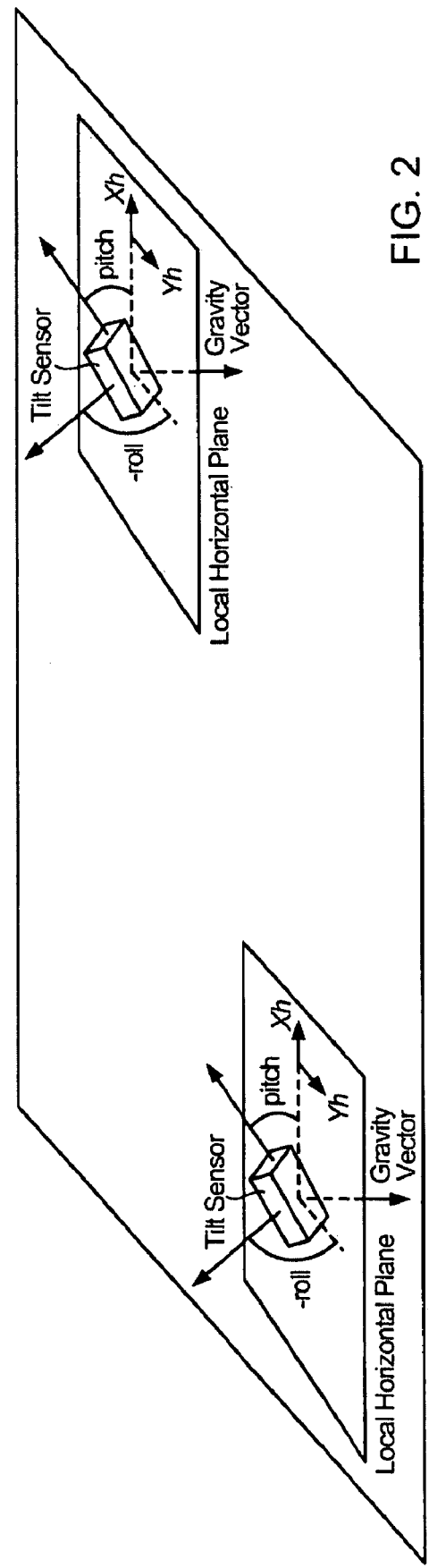
FIG. 2 is an illustration of a two-sensor accelerometer configuration.

What is needed is a solution which can reliably deliver a measure of linear motion and orientation. This invention discloses a method of integrating two 3D linear accelerometers in order to measure and provide 6D information (x, y, z, $\theta$, $\Phi$, $\psi$), see FIG. 2. Since, accelerometers deliver second momentum the measurements need to be integrated once to get the rate of change and second time to get the absolute measures.

Figure 3:
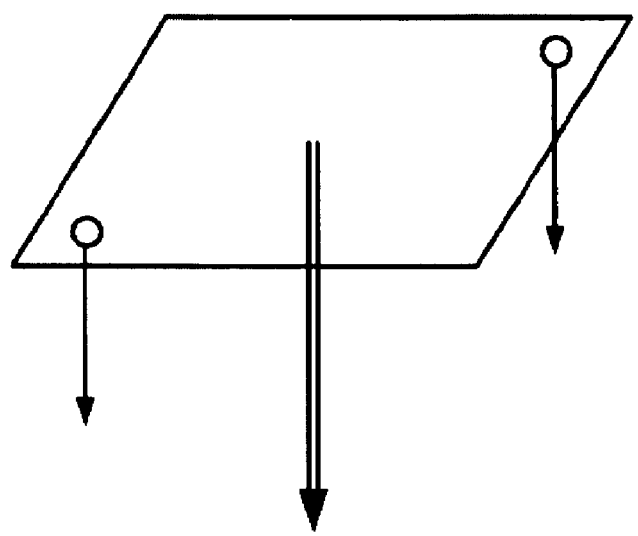
FIG. 3 is an illustration of linear movement of the two sensors shown in FIG. 2.
Figure 4:
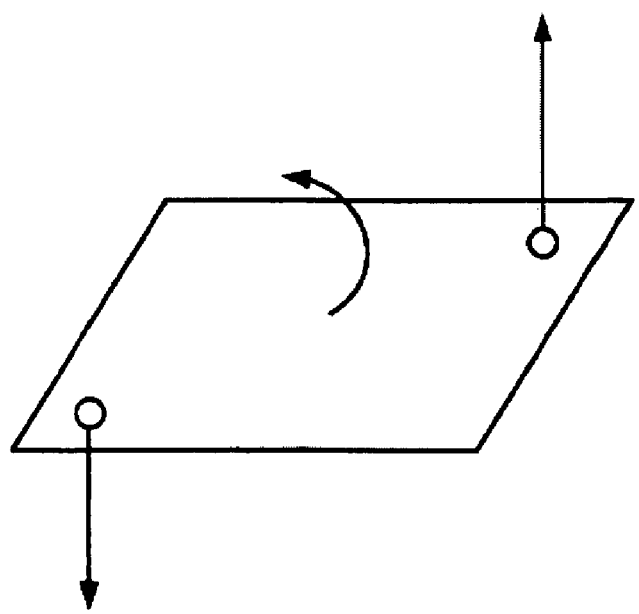
FIG. 4 is an illustration of angular movement of the two sensors shown in FIG. 2.

Two 3D accelerometers deployed at opposite corners of the board can sense the linear movement—sensors produce similar outputs (see FIG. 3), and sense orientation changes—sensors produce opposing outputs (see FIG. 4).

One key requirement is near simultaneous read-out of the measurements from both accelerometers.

In order to be able to efficiently use sensors in various applications, a sensor must provide several functions: control capability, measurement output and quality control.

An application programming interface (API) is defined which in addition to the control and common measurement output interface adds a quality control. The quality control has a bi-directional purpose. For example, on the input quality-of-service (QoS) control allows the sensor user (application developer) to prioritize the time per measurement vs. accuracy of the sensor measurement, it can specify how often the measurement is performed (periodic) and the duration of measurement period, define the event triggering the sensor measurement, threshold level for sensor output to trigger the measurement processing, length of measurement filtering (time constant), etc. The sensor QoS will add the accuracy measures to the raw measurement values: directional information accuracy, tilt accuracy, acceleration accuracy, rate of rotation accuracy, pressure accuracy, temperature accuracy, etc. It can also add specific event outputs such as "shock detected", (e.g., acceleration magnitude above 1000 g was detected), etc.

The availability of sensor QoS control functionality facilitates sensor integration and allows successful integration of the measurements from, multiple sensors for various applications utilizing sensor measurements.

TABLE 1

Example Sensor Measurement Specification

| Measurement | Data type | Unit (resolution) | Data range |
|---|---|---|---|
| Geomagnetic Compass | | | |
| Direction angle | 16-bit signed integer | 0.1° | 0 to 3599 (0° to 359.9°) |
| Direction angle accuracy | 4-bit unsigned integer | | 0 to 15° |
| Magnetic vector, magnitude | 16-bit signed integer | 0.1 µT | −15000 to 15000 (−1500 µT to 1500 µT) |

TABLE 1-continued

Example Sensor Measurement Specification

| Measurement | Data type | Unit (resolution) | Data range |
|---|---|---|---|
| Magnetic vector, x | 16-bit signed integer | 0.1 µT | −15000 to 15000 (−1500 µT to 1500 µT) |
| Magnetic vector, y | 16-bit signed integer | 0.1 µT | −15000 to 15000 (−1500 µT to 1500 µT) |
| Magnetic vector, z | 16-bit signed integer | 0.1 µT | −15000 to 15000 (−1500 µT to 1500 µT) |
| Orientation angle | | | |
| Pitch | 16-bit signed integer | 0.1° | −900 to 900 (−90.0° to 90.0°) |
| Roll | 16-bit signed integer | 0.1° | −1800 to 1800 (−180.0° to 180.0°) |
| Orientation angle accuracy | 4-bit unsigned integer | | 0 to 15° |
| Linear Acceleration | | | |
| Acceleration vector, magnitude | 16-bit signed integer | 0.1 mg | −30000 to 30000 (−3000 mg to 3000 mg) |
| Acceleration accuracy | 4-bit unsigned integer | | 0 to 10 mg |
| Acceleration vector, x | 16-bit signed integer | 0.1 mg | −30000 to 30000 (−3000 mg to 3000 mg) |
| Acceleration vector, y | 16-bit signed integer | 0.1 mg | −30000 to 30000 (−3 g to +3 g) |
| Acceleration vector, z | 16-bit signed integer | 0.1 mg | −30000 to 30000 (−3 g to +3 g) |

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method, comprising:
    via a sensor application interface:
        receiving, from an application, a measurement request for direction and orientation measurements and at least one input quality-of-service control associated with the direction and orientation measurements;
        in accord with the at least one input quality-of-service control, obtaining raw measurement data corresponding to the direction and orientation measurements from a plurality of sensors comprising at least two accelerometers; and
        returning to the application, at least a portion of the raw measurement data and an output quality-of-service control indicating an expected accuracy of at least one of the plurality of sensors in generating at least the portion of the raw measurement data, wherein the expected accuracy is based, at least in part, on a measurement period specified in the at least one input quality-of-service control.

2. The method of claim 1, wherein obtaining the raw measurement data comprises integrating measurements from each of the at least two accelerometers.

3. The method of claim 2, wherein integrating measurements from the at least two accelerometers provides six degrees of information.

4. The method of claim 3, wherein the six degrees of information includes linear motion measurements associated with an x-axis, a y-axis and a z-axis and orientation information associated with a roll θ, a pitch φ, and a yaw ψ.

5. The method of claim 1, wherein the output quality-of-service control comprises at least one of an expected directional information accuracy, an expected tilt accuracy, an expected acceleration accuracy, an expected rate of rotation accuracy, an expected pressure accuracy, or an expected temperature accuracy.

6. The method of claim 1, further comprising:
    returning one or more event values to the application.

7. The method of claim 6, wherein the one or more event values comprise a shock detected event value.

8. The method of claim 4, wherein at least one of the linear motion measurements or orientation measurements comprises at least one of: a direction angle measurement, a magnetic vector magnitude measurement, a magnetic vector x measurement, a magnetic vector y measurement, a magnetic vector z measurement, a pitch measurement, a roll measurement, an acceleration measurement, an acceleration vector x measurement, an acceleration vector y measurement, or an acceleration vector z measurement.

9. An apparatus having a sensor to sense linear motion and orientation information, the apparatus comprising:
    a first accelerometer;
    a second accelerometer, wherein the first and second accelerometers are integrated to sense linear motion information by producing similar outputs and orientation measurements by producing opposing outputs; and
    processor circuitry to execute operations for a sensor application interface, the operations to:
        receive, from an application, a request for the linear motion and orientation measurements and at least one input quality-of-service control associated with at least one of the linear motion measurements or the orientation measurements,
        in accord with the at least one input quality-of-service control, obtain raw measurement data from at least the first and second accelerometers, and return, to the application, at least a portion of the raw measurement data for at least the linear motion and orientation measurements and an output quality-of-service control indicating an expected accuracy of at least the first and second accelerometers in generating at least the portion of the raw measurement data, wherein the expected accuracy is based, at least in part, on a measurement period specified in the at least one input quality-of-service control.

10. The apparatus of claim 9, wherein the first accelerometer and the second accelerometer are oriented in a plane.

11. The apparatus of claim 10, wherein the first and second accelerometers measure six degrees of information.

12. The apparatus of claim 11, wherein the six degrees of information include linear motion information associated with an x-axis, a y-axis and a z-axis and orientation information associated with a roll $\theta$, a pitch $\phi$, and a yaw $\psi$.

13. The apparatus of claim 9, the sensor application interface operations further to return, to the application, an event identifier for at least one of the first accelerometer or the second accelerometer.

14. The apparatus of claim 13, wherein event identifier identifies an abrupt change in at least one of the linear motion or orientation information.

15. The apparatus of claim 14, wherein the abrupt change is identified by a shock detected event value.

16. The apparatus of claim 12, wherein at least one of the linear motion measurements or orientation measurements comprise at least one of: a direction angle measurement, a magnetic vector magnitude measurement, a magnetic vector x measurement, a magnetic vector y measurement, a magnetic vector z measurement, a pitch measurement, a roll measurement, an acceleration measurement, an acceleration vector x measurement, an acceleration vector y measurement, or an acceleration vector z measurement.

17. The method of claim 1, wherein the at least one input quality-of-service control identifies, at least in part, at least one of: a priority of time measurement, a measurement periodicity, an event triggering a sensor measurement, a threshold level associated with the event triggering the sensor measurement, or a length of measurement filtering.

18. The apparatus of claim 9, wherein the at least one input quality-of-service control identifies, at least in part, at least one of: a priority of time measurement, a measurement periodicity, an event triggering a sensor measurement, a threshold level associated with the event triggering the sensor measurement, or a length of measurement filtering.

19. A method, comprising:
with a plurality of sensors capable of measuring changes in a direction and an orientation, the plurality of sensors comprising at least two accelerometers:
receiving from a sensor application interface at least one input quality-of-service control associated with measuring the direction and the orientation;
in accord with the at least one input quality-of-service control, measuring raw measurement data corresponding to the direction and the orientation using at least the at least two accelerometers; and
returning to the sensor application interface, at least a portion of the raw measurement data and an output quality-of-service control indicating an expected accuracy of at least one of the plurality of sensors in generating at least the portion of the raw measurement data, wherein the expected accuracy is based, at least in part, on a measurement period specified in the at least one input quality-of-service control.

20. The method of claim 19, wherein measuring the raw measurement data comprises integrating measurements from each of the at least two accelerometers.

21. The method of claim 20, wherein integrating measurements from the at least two accelerometers provide six degrees of information.

22. The method of claim 21, wherein the six degrees of information includes linear motion measurements associated with an x-axis, a y-axis and a z-axis and orientation information associated with a roll $\theta$, a pitch $\phi$, and a yaw $\psi$.

23. The method of claim 22, wherein at least one of the linear motion measurements or orientation measurements comprises at least one of: a direction angle measurement, a magnetic vector magnitude measurement, a magnetic vector x measurement, a magnetic vector y measurement, a magnetic vector z measurement, a pitch measurement, a roll measurement, an acceleration measurement, an acceleration vector x measurement, an acceleration vector y measurement, or an acceleration vector z measurement.

24. The method of claim 19, wherein the output quality-of-service control comprises at least one of an expected directional information accuracy, an expected tilt accuracy, an expected acceleration accuracy, an expected rate of rotation accuracy, an expected pressure accuracy, or an expected temperature accuracy.

25. The method of claim 19, wherein the at least one input quality-of-service control identifies, at least in part, at least one of: a priority of time measurement, a measurement periodicity, an event triggering a sensor measurement, a threshold level associated with the event triggering the sensor measurement, or a length of measurement filtering.

26. The method of claim 19, further comprising:
returning one or more event values to the sensor application interface.

27. The method of claim 26, wherein the one or more event values comprise a shock detected event value.

* * * * *